United States Patent [19]

Drow

[11] 4,252,108
[45] Feb. 24, 1981

[54] SOLAR HEATING DEVICE

[76] Inventor: John P. Drow, 16383 Desert Knoll Dr., Victorville, Calif. 92392

[21] Appl. No.: 7,496

[22] Filed: Jan. 29, 1979

[51] Int. Cl.³ .......................... F24J 3/02; F28D 3/02
[52] U.S. Cl. .................................. 126/449; 126/441; 126/450; 165/117
[58] Field of Search ............... 126/438, 439, 447, 442, 126/423; 165/115, 117

[56] References Cited

U.S. PATENT DOCUMENTS

| 291,146 | 1/1884 | Calver | 126/439 |
|---|---|---|---|
| 1,661,473 | 3/1928 | Goddard et al. | 126/439 |
| 3,985,116 | 10/1976 | Kapany | 126/439 |
| 4,018,211 | 4/1977 | Barr | 126/439 |
| 4,084,574 | 4/1978 | Golay | 126/447 |
| 4,094,300 | 6/1978 | Young | 126/442 |
| 4,106,479 | 8/1978 | Rogers | 126/439 |

*Primary Examiner*—James C. Yeung
*Assistant Examiner*—Daniel O'Connor
*Attorney, Agent, or Firm*—William C. Babcock

[57] ABSTRACT

Set out herein is a solar heating panel adapted to exchange solar heat with fluids, the panel including a translucent upper surface covering the top of a rectangular enclosure, the enclosure further supporting on stand-offs a heat exchange panel. The heat exchange panel is provided with a plurality of tubular segments attached to the exposed surface thereof by which the solar rays received in the panel are reflected repeatedly until absorbed. It is contemplated to convey fluid around the tubular segments, the fluid thus exchanging heat therewith.

1 Claim, 3 Drawing Figures

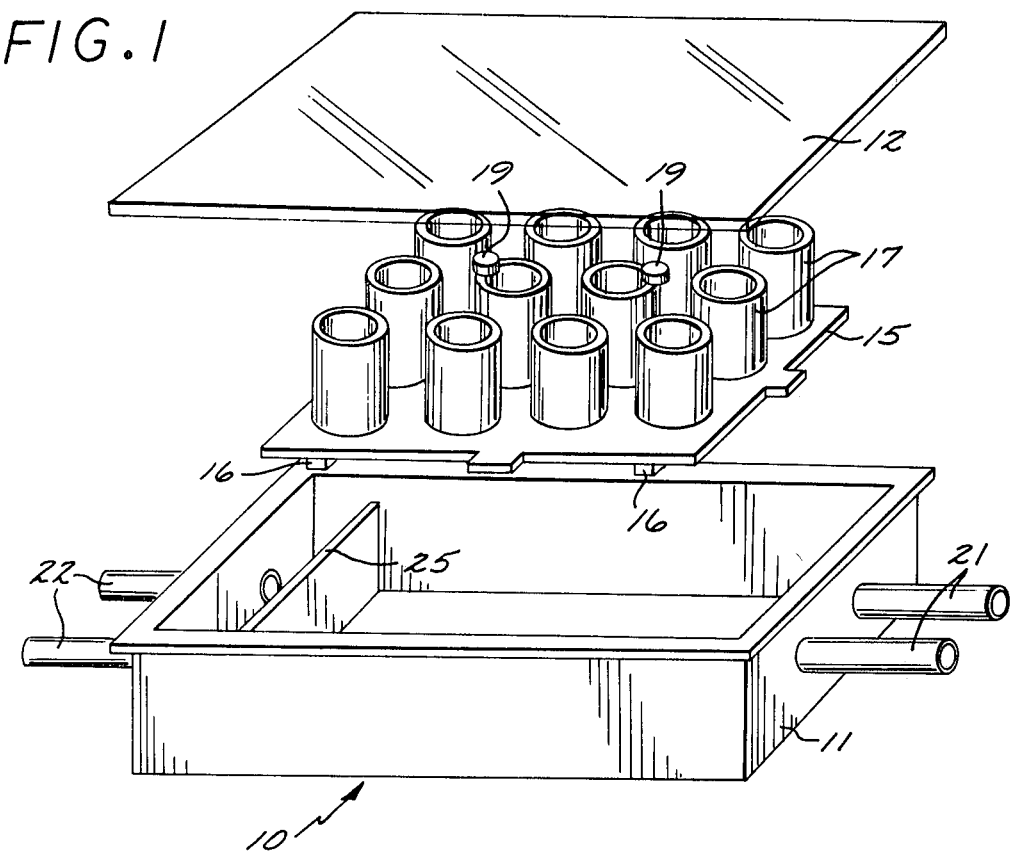
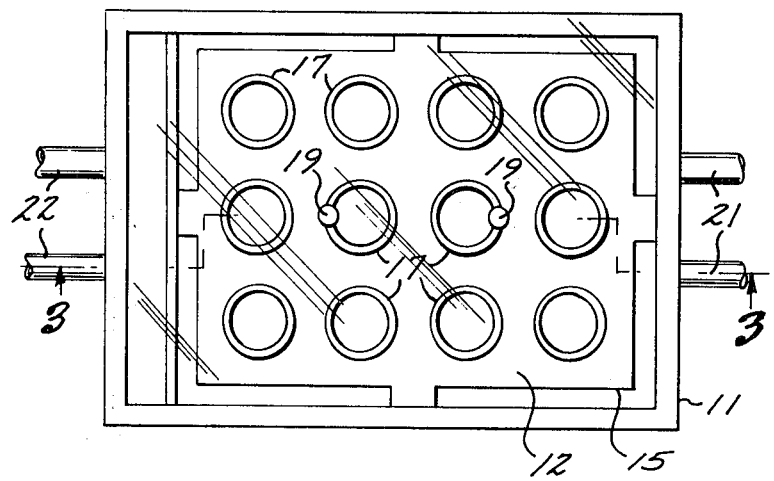
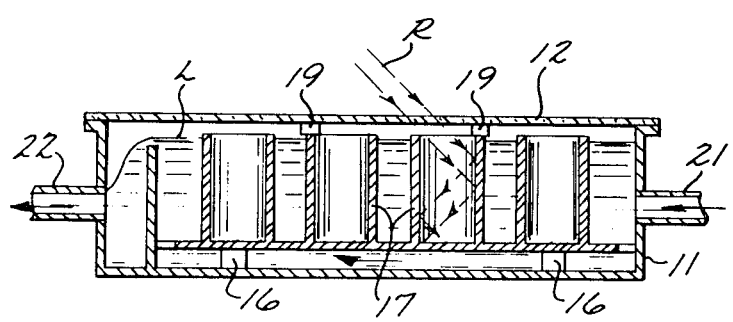

SOLAR HEATING DEVICE

BACKGROUND OF THE INVENTION

1. Field of the Invention

The present invention relates to solar heating devices, and more particularly to solar heat exchangers of the passive kind.

2. Description of the Prior Art

With the recent public interest in conserving energy and with the resulting attention to recovery of solar heat, various solar panels were developed in the recent past for collecting solar heat by heat exchange with fluid. Most frequently the solar panels of the previous kinds were of the tubular construction, each of the tubes being exposed to the sky in order to receive solar radiation. Heretofor the primary concern in heat exchangers of this kind was the cost of production thereof. While solar power is virtually inexhaustable, in commercial applications, stringent limitations exist in the amortized cost factor since it is this cost factor that must be traded off against the present cost of fuel. Both because of the relatively high cost of present manufacture and the low thermal efficiency of the more economical panels, full acceptance of solar heating has yet not occurred.

Low efficiency most frequently occurs because of reflective losses, the panel surfaces never achieving the full absorption factors of a black body and the greenhouse effect always allowing some of the heat to be radiated back out. Accordingly, each effort to reduce cost is accompanied by lower efficiency levels which in turn raises the cost per btu produced. For these reasons, inexpensive techniques for capturing solar energy are not vigorously sought and it is to this purpose that the present invention is directed.

SUMMARY OF THE INVENTION

Accordingly, it is the general purpose and object of the present invention to provide a solar collector structure having formed on the interior thereof a plurality of reflective surfaces by which solar radiation is trapped.

Other objects of the invention are to provide a solar collector structure having a convolved surface for multiple reflections of solar radiation.

Yet further objects of the invention are to provide a solar panel which by virtue of its structure can achieve high efficiencies at low cost.

Briefly these and other objects are accomplished within the present invention by providing a rectangular housing connected to pass fluid therethrough, the housing including a translucent upper panel through which solar radiation may be received. Disposed on the interior of the housing and supported in spaced relationship relative the bottom thereof is a solar collector comprising a flat surface on which a plurality of tubular segments are deployed. It is contemplated to form the support surface out of a black material and to attach thereto the foregoing tubular segments, each of the segments being once more black. These tubular segments then form reflective surfaces against which the solar rays are reflected until fully absorbed. The disposition of the tubular segment on the support system surface includes spaced passageways across which fluid can be conveyed. Thus each of the tubular segments extends the surface of the radiation receiving panel, increasing the efficiency thereof at minimal cost.

In order to facilitate each transmission, the foregoing tubular segments may be made of copper material structure, thus providing a low heat resistant path to the fluid. Thus the tubular segments may be formed by cutting standard copper pipe stock with the attendant economies and convenience in assembly.

BRIEF DESCRIPTION OF THE DRAWINGS

FIG. 1 is a perspective illustration, separated by parts of a solar collector constructed according to the present invention;

FIG. 2 is a top view of the solar collector shown in FIG. 1; and

FIG. 3 is a side view in section taken along line 3—3 of FIG. 2.

DESCRIPTION OF THE SPECIFIC EMBODIMENT

As shown in FIGS. 1-3 the inventive solar collector, generally designated by the numeral 10, includes a rectangular housing 11 closed on all surfaces and provided with a translucent cover 12 on the top thereof. It is contemplated to deploy the foregoing housing to an alignment exposing cover 12 to solar rays. In this form a greenhouse effect is achieved, the cover allowing the transmission of the solar rays into the interior of the housing while blocking the return of the infrared spectrum back out into the atmosphere. Deployed on the interior of housing 11 is a rectangular support panel 15 provided with a plurality of stand-offs 16 on the underside thereof and attached to the ends of a plurality of tubular segments 17 on the upper surface thereof. Segments 17 are attached to panel 15 in any conventional manner, the alignment thereof providing for a spaced disposition to allow the transfer of fluid therebetween. The plan form dimensions of panel 15 and consequently the deployment of tubular segments 17 occupies less than the full interior of the housing 11. Thus, a gap is formed between the peripheral edges of the panel and the interior cavity of housing 11 across which fluids can communicate both under and over the surfaces of the panel. In this form a radiation receiving surface is provided which includes both vertical and horizontal components. By virtue of these surface components, light rays that are transmitted through the cover 12 will be reflected within the confines of the housing until fully absorbed.

This particular configuration therefore insures a convoluted path for any light received on the interior of the housing, with the result that any light rays not absorbed in one surface will be absorbed at the surfaces to which they are reflected.

In order to reduce any conductive path from the tubular segments to the outer cover 12 it is contemplated to control the vertical dimension of stand-off 16 and segment 17 to a dimension less than the height of housing 11. Thus a separating gap will be formed between the upper ends of segment 17 and the translucent cover 12 insulating the segment from the cover. In order to insure this gap some of the segments 17 may be provided with insulating spacers 19 supporting the cover. In this form the inventive collector 10 may be utilized to heat any fluids passing through the interspaces between the segments 17 and between the panel 15 and the bottom of housing 11. To assure good heat transfer to the panel it is possible to form the foregoing tubular segments 17 out of a conductive material like copper, any conventional copper tubing being suitable for the purpose. To further increase the absorptive characterictics of the panel 15 and segment 17 both may be covered with black coating or paint, the coating acting to reduce the reflective levels of the light received.

In this arrangement of parts, fluid may be conveyed into and out of housing 11 by a plurality of inlet pipes 21 and outlet pipes 22. While both gaseous and liquid fluids may be utilized in the foregoing heat exchange, liquid fluids are more conveniently handled and are therefore more conveniently practiced in household use.

For this reason, housing 11 may include a dam 25 extending across the opening of the outlet pipe 22, dam 25 setting a liquid level L to which the foregoing tubular segments 17 are immersed. It is within this liquid level depth that the heat transfer occurs from the tubular segment and the support panel; the heat input taking place by the capture of light rays R on the interior of each segment.

By virtue of the foregoing parts an assembly is provided which may be formed out of conventional stock, segment 17 being of any standard copper pipe configuration, either bonded or soldered to panel 15. This convenience of parts and the convenience mode of attachment thereof renders the foregoing device inexpensive and commericially acceptable to the average home owner.

Obviously many modifications and changes can be made to the foregoing description without departing from the spirit of the invention. It is therefore intended that the scope of the invention be determined solely on the claims appended hereto.

What is claimed is:

1. A solar collector, comprising:
   a. a substantially rectangular hollow housing defined by a bottom surface and a pair of side walls and first and second end walls, said first end wall having a cold water inlet therein and a heated water outlet in said second end wall;
   b. a translucent panel secured to the top of said housing;
   c. a transverse dam in said housing intermediate said first and second end walls, said dam extending substantially above the height of said heated water outlet;
   d. a horizontal metal support disposed above said bottom and extending from said dam to said first end wall, said support having at least a first opening therein adjacent said first end and a second opening therein adjacent said dam;
   e. a plurality of laterally and longitudinally spaced vertical cylindrical metal segments in said housing that have first and second ends, said first ends secured to said support and said segments extending upwardly therefrom for said second ends to be disposed below said panel, with the interior surfaces of said cylindrical segments effecting multiple reflections of actinic rays is absorbed by said segments to subsequently flow therefrom to the water surrounding said segments and to said support, with water entering said housing through said inlet being of minimum temperature and maximum density and tending to flow downwardly through said first opening and longitudinally under said support to flow upwardly through said second opening and in so doing absorbing heat from the underside of said support, said water after flowing from said second opening being further heated by heat conducted thereto through said cylindrical segments, with water of maximum temperature and minimum density overflowing said dam to discharge from said outlet, said support serving the dual function of maintaining said segments in said spaced relationship and transferring heat from said segments to said water in said housing.

* * * * *